United States Patent [19]
Yamashita

[11] Patent Number: 5,307,851
[45] Date of Patent: May 3, 1994

[54] HEAVY LOAD PNEUMATIC RADIAL TIRE

[75] Inventor: Nobuhiro Yamashita, Hiratsuka, Japan

[73] Assignee: The Yokohama Rubber Co., Ltd., Tokyo, Japan

[21] Appl. No.: 838,660

[22] Filed: Feb. 21, 1992

[30] Foreign Application Priority Data

Apr. 8, 1991 [JP] Japan .................. 3-075135

[51] Int. Cl.⁵ ............................................. B60C 11/12
[52] U.S. Cl. .......................... 152/209 R; 152/DIG. 3
[58] Field of Search .......... 152/209 R, 209 D, DIG. 3

[56] References Cited

U.S. PATENT DOCUMENTS

| | | | |
|---|---|---|---|
| 4,449,560 | 5/1984 | Tansei et al. | 152/209 R |
| 4,739,812 | 4/1988 | Ogawa et al. | 152/209 R |
| 4,884,606 | 12/1989 | Matsuda et al. | 152/209 R |
| 4,993,466 | 2/1991 | Ochiai | 152/209 R |

FOREIGN PATENT DOCUMENTS

| | | | |
|---|---|---|---|
| 0146606 | 7/1986 | Japan | 152/209 R |
| 0134313 | 6/1988 | Japan | 152/209 R |
| 0208708 | 9/1991 | Japan | 152/209 R |
| 2036663 | 7/1980 | United Kingdom | 152/209 D |

Primary Examiner—Michael W. Ball
Assistant Examiner—Nancy T. Krawczyk
Attorney, Agent, or Firm—Nikaido, Marmelstein, Murray & Oram

[57] ABSTRACT

A heavy load pneumatic radial tire which includes at least one carcass layer in a radial direction and a reinforcing belt comprising at least two layers of metal cords around the outer periphery of the carcass in a tread portion, and in which a plurality of ribs partitioned by a plurality of main grooves extending in a tire circumferential direction are formed in a main grounding region of the tread surface and a narrow groove having a groove width of 1.5 to 5 mm and a groove depth of 60 to 120% of the depth of the main groove are disposed in a shoulder end zone of the ribs positioned at the shoulder in the tire circumferential direction, characterized in that a large number of primary kerfs extending from the narrow groove towards the tread center are intermittently disposed in the tire circumferential direction, and a large number of secondary kerfs extending in the tire circumferential direction are intermittently disposed at the positions closer to the tread center than the primary kerfs in the tire circumferential direction.

8 Claims, 5 Drawing Sheets

HEAVY LOAD PNEUMATIC RADIAL TIRE

BACKGROUND OF THE INVENTION

This invention relates to a heavy load pneumatic radial tire used for vehicles such as trucks and buses.

Radial tires have recently been used for heavy load vehicles such as trucks and buses and have exhibited their excellent characteristics such as high speed performance, wear resistance and low fuel cost. To withstand a heavy load, the heavy load pneumatic radial tire includes a reinforcing belt of metal cords disposed at its tread in order to provide extremely high rigidity to the tread, and is used while air of a high internal pressure is charged into it.

In the heavy load pneumatic radial tire which has high rigidity at the tread and into which air of a high internal pressure is charged, however, there occurs the problem that shoulder off wear develops because a slip at both shoulders with respect to a road surface is greater than at the tread center. When the heavy load pneumatic radial tire runs on a road surface having wheel tracks, the tire receives an excessive external force from the road surface when it escapes from the wheel tracks. Accordingly, there occurs another problem that a steering wheel is steered in the wrong direction or in other words, the problem of so-called "wandering" occurs.

The problems described above which are inherent in the conventional heavy load pneumatic radial tires have been solved to some extents by forming thin grooves or sipes having a groove width of 1.5 to 5 mm and a groove depth 60 to 120% of the depth of main grooves at both shoulders in a tire circumferential direction. However, this counter-measure has not necessarily been sufficient and has not entirely been sufficient for the former problem, that is, for the shoulder-off wear.

SUMMARY OF THE INVENTION

The present invention aims at providing a heavy load pneumatic radial tire which further improves the prevention function of wandering when running on a road surface having wheel tracks, and further improves particularly the prevention function of the shoulder-off wear at the shoulders.

In a heavy load pneumatic radial tire which includes at least one carcass layer in a radial direction and a reinforcing belt comprising at least two layers of metal cords around the outer periphery of the carcass in a tread portion and in which a plurality of ribs partitioned by a plurality of main grooves extending in a tire circumferential direction are formed in a main grounding region of the tread surface and a narrow groove having a groove width of 1.5 to 5 mm and a groove depth of 60 to 120% of the depth of the main groove are disposed in a shoulder end zone of the ribs positioned at the shoulders in the tire circumferential direction, the objects of the invention described above can be accomplished by a heavy load pneumatic radial tire characterized in that a large number of primary kerfs extending from the narrow groove towards the tread center are intermittently disposed in the tire circumferential direction, and a large number of secondary kerfs extending in the tire circumferential direction are intermittently disposed at the positions closer to the tread center than the primary kerfs in the tire circumferential direction.

As described above, a large number of primary kerfs extending from the narrow groove disposed at the end portion of the shoulder towards the tread center are intermittently formed in the tire circumferential and the secondary kerfs extending in the tire circumferential direction are intermittently formed in the tire circumferential direction at the positions closer to the tread center side than the primary kerfs. Accordingly, the combination of the narrow groove and both kerfs provides the flexible structure wherein the rigidity is rendered lowest at the outermost portion of the shoulder ends and becomes progressively higher towards the tread center. This flexible structure first allows the frictional force in the tire circumferential direction occurring due to the slip of the shoulder portions to be relieved by the flexibility of the narrow groove and of the primary kerfs and further cuts off the force (shearing force) propagating towards the tread center by the flexibility of the secondary kerfs disposed in the tire circumferential direction. Accordingly, the occurrence of the shoulder-off wear can effectively be suppressed.

Since the shoulder end portions are flexible as described above, the external force the tire receives from the road surface when escaping from the wheel tracks can be mitigated, and wandering resulting from unintended steering in the wrong direction can be eliminated.

DETAILED DESCRIPTION OF THE PREFERRED EMBODIMENTS

Figure 1:
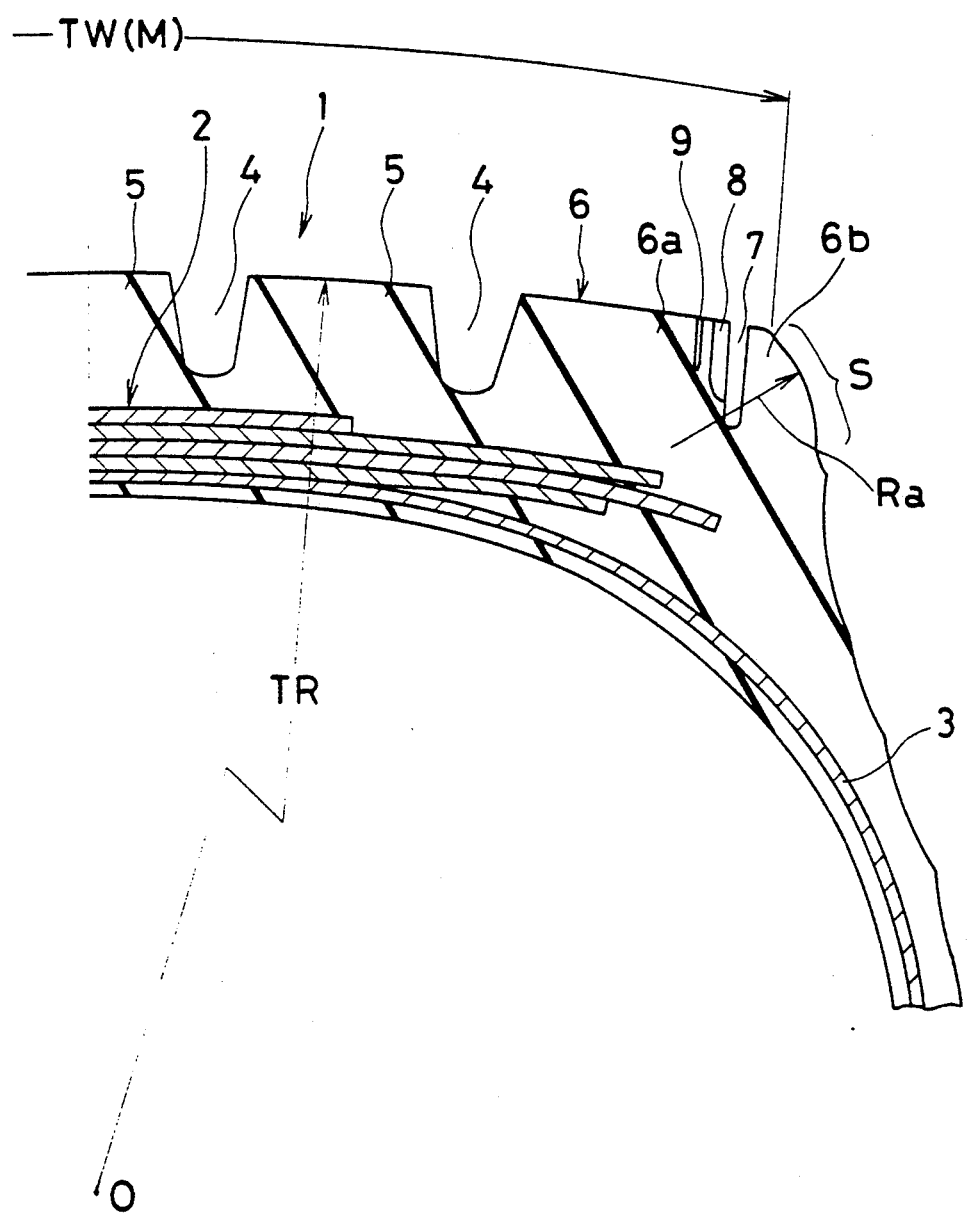
FIG. 1 is a semi-sectional view showing a tread of a heavy load pneumatic radial tire according to an embodiment of the present invention.
Figure 2:
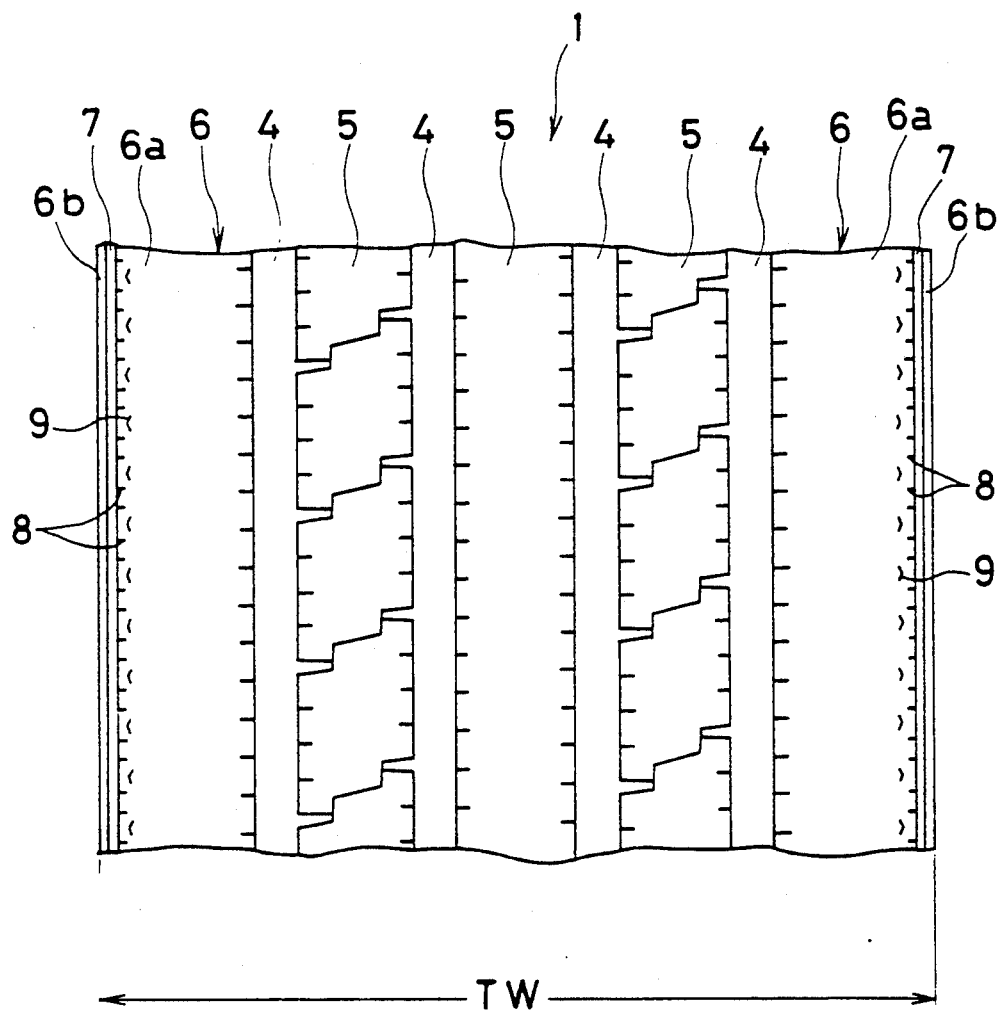
FIG. 2 is a plan view showing a tread surface of the heavy load radial pneumatic tire shown in FIG. 1.

FIGS. 1 and 2 exemplarily show a heavy load pneumatic radial tire of the present invention. Reference numeral 1 denotes a tread, 2 is reinforcing belts disposed inside the tread 1 in a tire circumferential direction, and 3 is a carcass.

The carcass 3 comprises at least one layer of cords in which reinforcing cords are so arranged as to substantially describe an angle of 90° to the tire circumferential direction. Metal cords such as steel cords or organic fiber cords such as Nylon, polyester, and polyaramide are preferably used as the reinforcing cords. The reinforcing belt 2 comprises at least two layers comprising metal cords such as steel cords and provides extremely high rigidity to the tread 1. The tread surface of the tread 1 has a sectional shape such that a main grounding region M is defined by an arc having a radius of curvature TR, and an auxiliary grounding region S consisting of an arc having a radius of curvature Ra is defined at each of its shoulders.

The main grounding region M is primarily the grounding surface at the time of straight drive and the auxiliary grounding region S is used as the grounding surface at the time of cornering or getting over a wheel track. A plurality of main grooves 4 are so defined on the tread surface of the main grounding region M as to extend in the tire circumferential direction, and these main grooves dividedly define a plurality of ribs 5 at the center. Ribs 6 which are wider than the ribs 5 are dividedly formed at both shoulders.

A sipe 7 the width of which is by far smaller than the width of the main groove 4 is linearly disposed in the ribs 6 of the shoulder near the shoulder end in such a manner as to extend in the tire circumferential direction and to divide the rib 6 into a divided rib 6a having a greater width and a divided rib 6b having a smaller width. This sipe 7 is from 1.5 to 5 mm wide and has a depth which is within the range of 60 to 120% of the depth of the main groove 4. A large number of primary kerfs 8 which extend towards the tread center while keeping contact with this sipe 7 are intermittently disposed in the tire circumferential direction. A large number of secondary kerfs 9 which extend in the tire circumferential direction are intermittently disposed in the tire circumferential at positions somewhat spaced apart from the inner end portions of the primary kerfs 8 towards the tread center.

Though the primary kerf 8 described above must extend in the tire width-wise direction while keeping contact with the narrow groove 7, its tire width-wise direction need not always be the radial direction which is strictly at right angles to the tire circumferential direction. The shape of the primary kerf 8 need not always be linear as depicted in the drawing but it may be a connected line or may be curved. Similarly, the secondary kerf 9, too, must extend in the tire circumferential direction but its tire circumferential direction need not be strictly at 0° to the tire circumferential direction. In other words, it may have some inclination, may be bent as depicted in the drawing, or may be curved.

More definitely, when the length of the primary kerf 8 in the tire circumferential direction is u, its length in the tire radial direction is b, the length of the secondary kerf 9 in the tire circumferential direction is n and its length in the tire radial direction is v, the primary kerf 8 and the secondary kerf 9 preferably satisfy the relations $b/u \geq 3$ and $n/v \geq 3$ (see FIG. 5), respectively, within the range of allowance of the directions and shapes described above.

As described above, the combination of the narrow groove 7 continuing in the circumferential direction, the primary kerfs 9 in the tire widthwise direction which are intermittently disposed in the tire circumferential direction and the secondary kerfs 9 in the tire circumferential direction which are intermittently disposed in the tire circumferential direction provides a flexible structure which renders the rigidity of the shoulder end portions lowest at the outermost portions and makes it progressively higher towards the inside, and this structure relieves the frictional force and suppresses the shoulder-off wear. In order to further effectively exhibit such an effect, the sizes and dispositions of the primary and secondary kerfs 8, 9 are determined in the following way in association with the tread expansion width TW and the depth h of the narrow groove 7.

Figure 3:
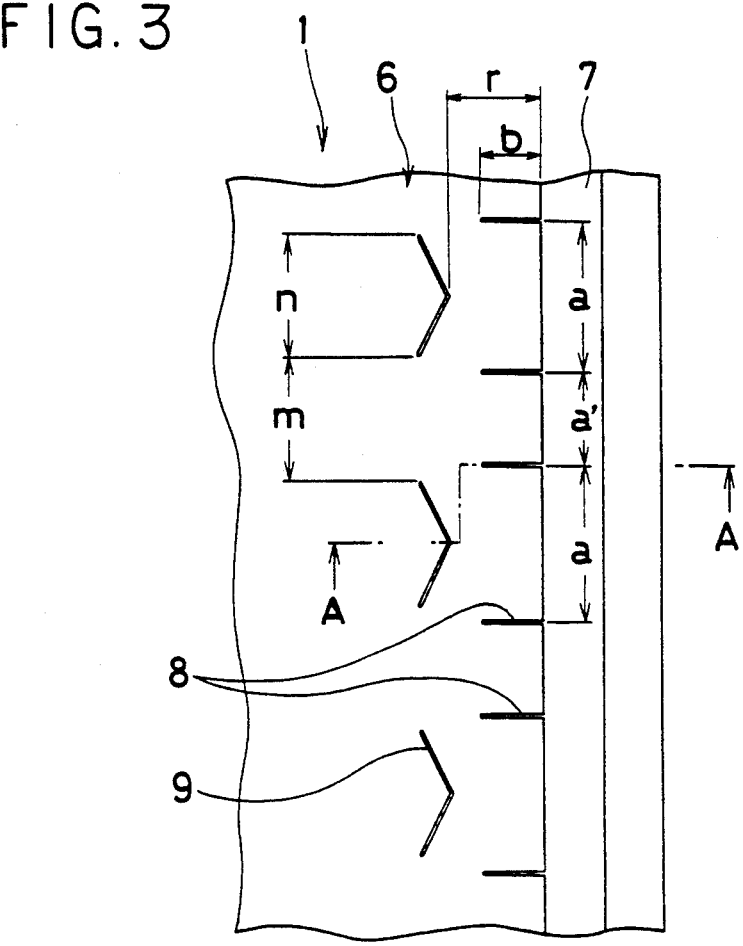
FIG. 3 is an enlarged plan view showing the principal portions of this invention.
Figure 4:
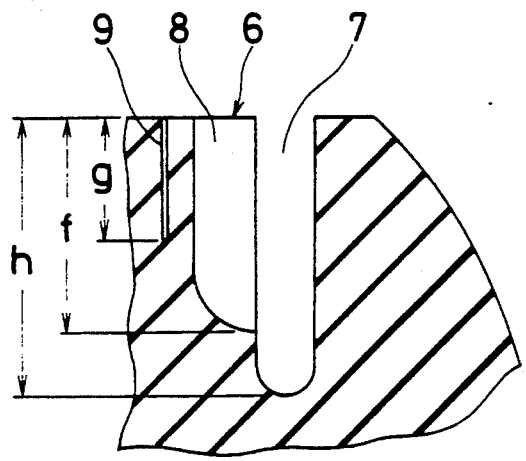
FIG. 4 is a sectional view taken along line A—A of FIG. 3.
Figure 5:
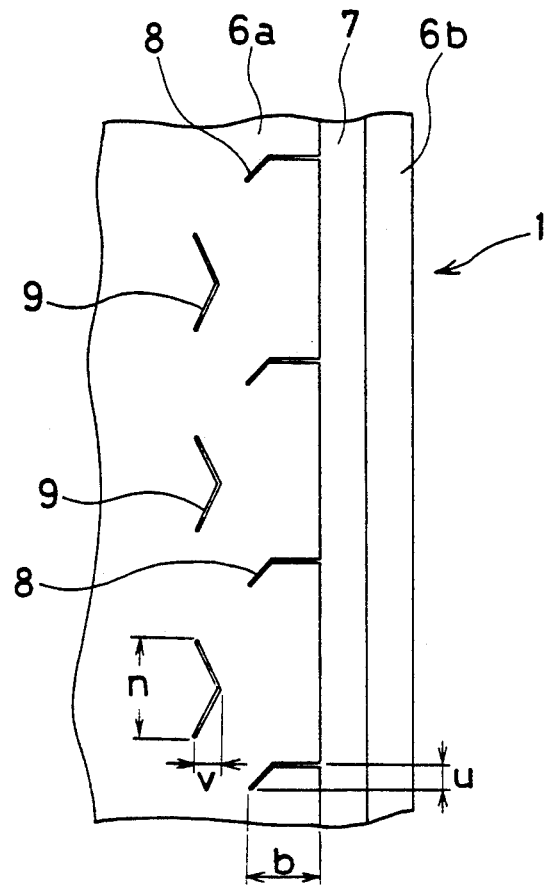
FIG. 5 is an enlarged plan view showing the principal portions of another embodiment of the present invention.

Referring to FIGS. 3 to 5, the gap a of the primary kerfs 8 in the tire circumferential direction is set to be 1 to 7% of the tread expansion width TW, its length b in the tire radial direction is set to be 0.5 to 3% of the tread expansion width TW and its depth f is set to be 40 to 100% of the depth h of the narrow groove 7. The length n of the secondary kerf 9 in the tire circumferential direction is set to be 1 to 6% of the tread expansion width TW, its gap in the tire circumferential direction is set to be 50 to 400% of the length n; its depth g is set to be 30 to 100% of the depth f of the primary kerf 8, and the distance r spaced apart from the narrow groove 7 in the tire radial direction is set to be from 120 to 400% of the length b of the primary kerf 8.

If the length b of the primary kerf 8 in the transverse direction is smaller than 0.5% of the tread expansion width TW or if the gap of the tire circumferential direction is greater than 7% of the tread expansion width TW, the rigidity of the shoulder portions becomes excessively great. If the length b in the transverse direction is greater than 3% of the tread expansion width TW or the gap a in the tire circumferential direction is smaller than 1% of the tread expansion width TW, the rigidity of the shoulder portions becomes excessively low, and non-uniform wear is more likely to occur. If the depth f of the primary kerf 8 is smaller than 40% of the depth h of the narrow groove 7, the effect of this primary kerf 8 drops and if it is greater than 100% of the latter, cracks are likely to develop in the bottom of the primary kerf 8.

As to the secondary kerf 9, if its distance r from the narrow grooves 7 is smaller than 120% of the length b of the primary kerf 8, cracks are likely to occur between the primary kerf 8 and the secondary kerf 9, and if it is greater than 400%, the effect of the secondary kerf 9 drops. If its length n in the tire circumferential direction is smaller than 1% of the tread expansion width TW, the effect of the secondary kerf 9 drops and if it is greater than 6%, the motion of the outside portion of the secondary kerf 9 becomes locally great and non-uniform wear is likely to occur. If the gap m in the tire circumferential direction is smaller than 50% of the length n of this secondary kerf 9, the motion of the outside portion of the secondary kerf 9 becomes great and non-uniform wear is likely to occur. If it is greater than 400%, the effect of the secondary kerf 9 drops. If the depth g of the secondary kerf 9 is smaller than 30% of the depth f of the primary kerf 8, the effect of the secondary kerf 9 drops and if it is greater than 100%, cracks are likely to occur from the secondary kerf 9.

According to the present invention described above, a large number of primary kerfs extending from the narrow groove disposed at one of the end portions of the shoulder towards the tread center are intermittently disposed in the tire circumferential direction and a large number of secondary kerfs extending from the primary kerfs further in the tire circumferential direction are intermittently formed at the positions on the tread center side in the tire circumferential direction. Accordingly, the combination of the narrow groove with both of the kerfs provides the flexible structure in which the rigidity of the shoulder is made lowest at the outermost portion and becomes progressively higher towards the inside, and the occurrence of the shoulder-off wear can effectively be suppressed.

Since each shoulder end portion is made flexible as described above, it is possible to mitigate the external force which the tire receives from the road surface when it escapes from the wheel tracks, and to prevent wandering.

EXAMPLES

Three kinds of heavy load pneumatic radial tires, i.e., the tire of this invention and conventional tires A and B, were trial produced so that they had the same tire size of 1122.5 and the same tread expansion width TW of 210 mm but had different tread patterns as described below.

Figure 6:
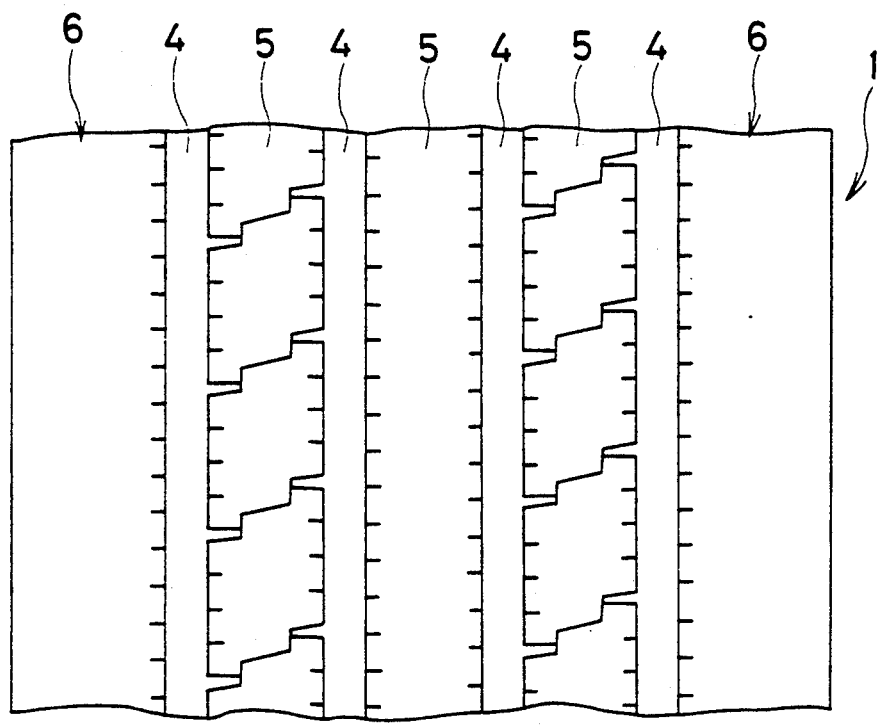
FIG. 6 is a plan view showing a tread of a conventional tire A.

Tire of the Present Invention:
 Tread pattern: FIG. 2
 Narrow groove: width=2.5 mm, depth (h)=15 mm
 Primary kerf: a=8 mm, a'=6 mm, b=2 mm, f=13 mm, u=0
 Secondary kerf: r=3 mm, n=4 mm, m=9 mm, g=6 mm, v=1 mm Conventional Tire A:
 Tread pattern: FIG. 6

Figure 7:
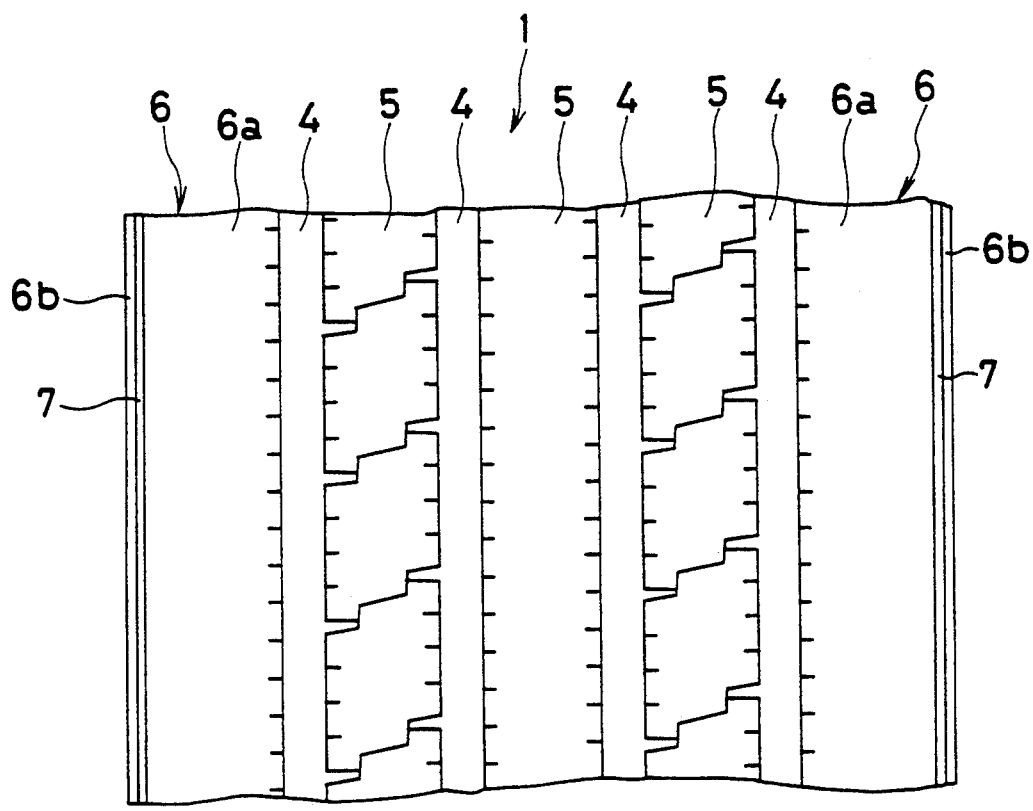
FIG. 7 is a plan view showing the tread of a conventional tire B.

Conventional Tire B:
 Tread pattern: FIG. 7
 Narrow groove: width=2.5 mm, depth (h)=15 mm Each of the three kinds of tires described above was fitted to the front wheel of a large vehicle (2-D 4), and non-uniform wear resistance at the shoulder and wear resistance of the tread were evaluated under the following measurement condition.

Figure 8:
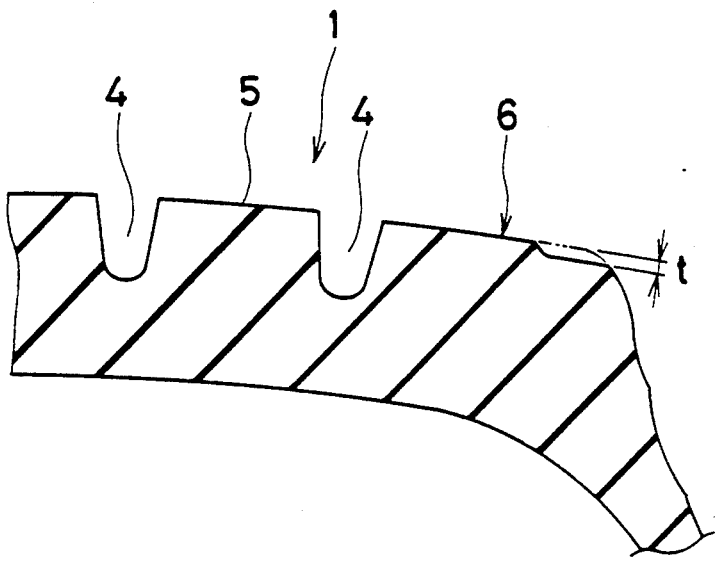
FIG. 8 is a sectional explanatory view showing shoulder-off wear of conventional tires.

Non-uniform wear resistance:
After running of 20,000 km on a pavement road surface, the step height t (see FIG. 8) at the shoulder was measured.

Wear resistance:
After running of 40,000 km, the wear of the tread was measured. The result of measurement was compared in terms of the reciprocal of the measurement value and was expressed by an index using the reciprocal of the measurement value of the conventional tires as 100. The greater this index value, the higher the wear resistance.

TABLE 1

|  | Conventional Tire A | Conventional Tire B | Tire of Present Invention |
| --- | --- | --- | --- |
| Non-Uniform Wear Resistance | 2.2 mm | 1.2 mm | nil |
| Wear Resistance | 100 | 98 | 98 |

As can be understood from Table 1, the heavy load pneumatic radial tire of the present invention has higher non-uniform wear resistance at the shoulder than the conventional tires. The wear resistance of the tire of the present invention does not exhibit a remarkable drop in comparison with the Conventional Tire A and can maintain tire wear resistance substantially equal to that of the Conventional Tire B.

What is claimed is:

1. A heavy load pneumatic radial tire which includes at least one carcass layer in a radial direction and a reinforcing belt comprising at least two layers of metal cords around the outer periphery of said carcass in a tread portion, and in which a plurality of ribs partitioned by a plurality of main grooves extending in a tire circumferential direction are formed in a main grounding region of the tread surface and a narrow groove having a groove width of 1.5 to 5 mm and a groove depth of 60 to 120% of the depth of said main groove are disposed in a shoulder end zone of said ribs positioned at the shoulder in the tire circumferential direction, characterized in that a large number of primary kerfs extending from said narrow groove towards the tread center are intermittently disposed in the tire circumferential direction, and a large number of secondary kerfs extending in the tire circumferential direction are intermittently disposed within the shoulder ribs at the positions closer to the tread center than said primary kerfs in the tire circumferential direction, the length in the tire radial direction of each said primary kerf being at least three times the length in the tire circumferential direction thereof and, the length in the tire circumferential direction of each said secondary kerf being at least three times the length in the tire radial direction thereof.

2. A heavy load pneumatic radial tire according to claim 1, wherein the gap between mutually adjacent ones of said primary kerfs in the tire circumferential direction is 1 to 7% of a tread expansion width.

3. A heavy load pneumatic radial tire according to claim 1, wherein the length in the tire radial direction of one said primary kerf is 0.5 to 3% of a tread expansion width.

4. A heavy load pneumatic radial tire according to claim 1, wherein the depth of said primary kerf is 40 to 100% of the depth of said narrow groove.

5. A heavy load pneumatic radial tire according to claim 1, wherein the length in the tire circumferential direction of one said secondary kerf is 1 to 6% of a tread expansion width.

6. A heavy load pneumatic radial tire according to claim 1, wherein the gap between mutually adjacent ones of said secondary kerfs in the tire circumferential direction is 50 to 400% of the circumferential length of one said secondary kerf.

7. A heavy load pneumatic radial tire according to claim 1, wherein the depth of said secondary kerf is 30 to 100% of the depth of said primary kerf.

8. A heavy load pneumatic radial tire according to claim 1, wherein the distance of said secondary kerf from said narrow groove in the tire radial direction is 120 to 4005 of the radial length of one said primary kerf.

* * * * *